United States Patent [19]

Matsumoto

[11] Patent Number: 4,880,343
[45] Date of Patent: Nov. 14, 1989

[54] LOCK NUT HAVING LOCK MEMBER OF SHAPE MEMORY RECOVERY ALLOY

[75] Inventor: Hisao Matsumoto, Amagasaki, Japan

[73] Assignee: Matsumoto Kokan Co., Ltd., Amagasaki, Japan

[21] Appl. No.: 103,006

[22] Filed: Sep. 30, 1987

[51] Int. Cl.⁴ .................. F16B 39/12; F16B 39/34
[52] U.S. Cl. ..................... 411/222; 411/303; 411/324; 411/437; 411/909
[58] Field of Search ........ 411/222, 223, 231, 232–236, 411/226, 303, 307, 324, 288–291, 361, 909, 437; 29/447

[56] References Cited

U.S. PATENT DOCUMENTS

| | | | |
|---|---|---|---|
| 1,992,272 | 2/1935 | Wilson | 411/222 |
| 2,016,000 | 10/1935 | Freeland | 411/226 |
| 2,385,159 | 9/1945 | Peters | 411/226 |
| 4,198,081 | 4/1980 | Harrison et al. | 29/447 |
| 4,248,285 | 2/1981 | Flaig | 411/222 |
| 4,619,568 | 10/1986 | Carstensen | 411/222 |

Primary Examiner—Neill R. Wilson
Attorney, Agent, or Firm—Armstrong, Nikaido, Marmelstein, Kubovcik & Murray

[57] ABSTRACT

A lock nut comprising a lock member prepared from a shape memory alloy and serving as a backup member for a fastening nut.

3 Claims, 3 Drawing Sheets

LOCK NUT HAVING LOCK MEMBER OF SHAPE MEMORY RECOVERY ALLOY

The present invention relates to lock nuts, and more particularly to a lock nut for use on a screw which is used widely as a fastening member in machines and apparatus to prevent the screw from loosening.

Numerous lock nuts have heretofore been proposed which differ in type, construction and friction providing means, but none of them are capable of reliably preventing loosening.

Conventional lock nuts are divided generally into two types: those preventing loosening mechanically, and those utilizing chemical properties for locking. The lock nuts of the former type include, for example, a nut connected to a bolt by a pin, a double nut for use in combination with a bolt, a nut to be screwed down on another nut to prevent its loosening, a nut having a threaded portion which is partially tubular or has an altered pitch, and a nut fixedly provided with a spring ring having cutouts. Each of these nuts is adapted to lock itself or another nut mechanically. As a lock nut of the latter type, it is known to adhere a nut to the bolt with an adhesive provided therebetween. The use of the adhesive involves the drawback that unless the portions to be joined together are completed pretreated, the nut will not be bonded to the bolt. Especially when the nut starts loosening, it is totally impossible to prevent the loosening.

An object of the present invention is to provide a reliable lock nut of simple construction which does not require any precision working, complex structure or a larger number of parts unlike the conventional lock nuts.

Another object of the invention is to provide a lock nut which is capable of preventing loosening reliably without using any adhesive or the like.

Another object of the invention is to provide a lock nut which is easy to release from locking position.

These objects of the present invention can be fulfilled by using an annular lock member of shape memory alloy as a backup member for a fastening nut, or by forming a portion of the fastening nut by a ring of shape memory alloy.

Thus, the present invention provides a lock nut utilizing the nature of a shape memory alloy, a new material, which restores itself to a pre-memorized shape when heat-treated.

Basically, the present invention is characterized in that an annular lock member made of a shape memory alloy is used as a backup member for a fastening nut. The lock member is fitted in a portion of the fastening nut or is used in combination with the fastening nut. Stated more specifically, a shape memory alloy is made into a piece of predetermined shape, which is then enlarged by the application of external pressure to obtain the lock member. After the fastening nut has been screwed up tight on a bolt along with the lock member, the lock member of shape memory alloy is caused to restore itself to the original shape on contraction by being heated to a specified temperature, whereby the lock member is firmly joined to the bolt as if by shrink fit.

The present invention will be described below in greater detail with reference to the accompanying drawings, in which:

FIGS. 1(A) to (C) show a lock member embodying the invention and adapted for use with a conventional fastening nut, FIG. 1(A) being a side elevation in vertical section, FIG. 1(B) being a plan view and FIG. 1(C) showing the lock member as it is used along with the conventional fastening nut;

FIGS. 2(A) and (B) show another lock member of the invention as fitted in a portion of a conventional fastening nut, FIG. 2(A) being a side elevation in vertical section, and FIG. 2(B) being a plan view;

FIG. 3(A) is a perspective view showing another lock member embodying the invention and adapted for use with a conventional fastening nut;

FIGS. 3(B) to (F) are plan views showing different modifications of the lock member of FIG. 3(A);

FIGS. 4(A) and (B) are diagrams schematically showing another lock member embodying the invention;

Figure 1A:
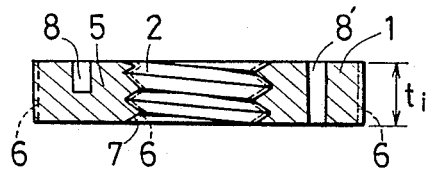
Figure 1B:
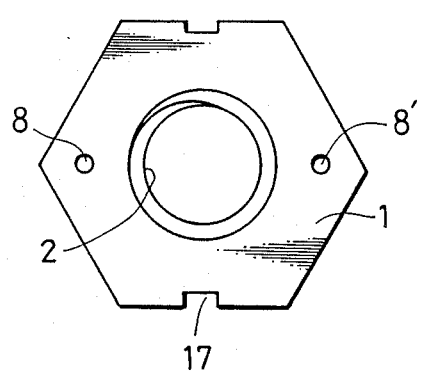
Figure 1C:
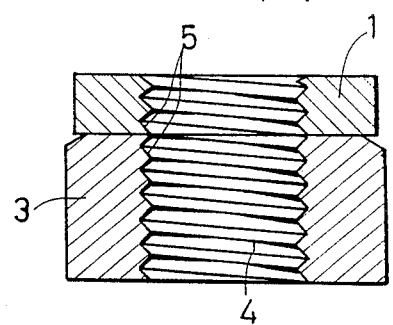

The lock member 1 shown in FIG. 1 is an annular plate made of a shape memory alloy and having a hexagonal outer periphery. The lock member 1 is threaded at its inner periphery 2 as indicated at 5 in the same dimensions as the threads 4 of a conventional nut 3 or to fit a bolt slightly more loosely than the nut 3. The lock member 1, although hexagonal as shown in FIG. 1, may be otherwise polygonal, or circular or elliptical. The lock member has a thickness t1 which is at least about one-half of the width of the thread 4 of the fastening nut 3, preferably approximately equal to the combined width of two to three threads 4. The lock member 1 has a width w1 which is equal to or nearly equal to the width of the nut 3.

The lock member 1 is prepared by making a piece of shape memory alloy shaped and dimensioned as indicated by broken lines 6 in FIG. 1 and having a predetermined shape memorized therein at a specified temperature, and thereafter forcibly enlarging the piece to the dimensions indicated in solid lines 7. The lock member 1 as enlarged may be threaded as indicated in the solid line 7.

Before using the lock member 1, the conventional nut 3 is screwed on a bolt tight, and the lock member 1 is then screwed down on the nut 3. To render the lock member 1 easy to screw up tight, the member has a hexagonal or otherwise polygonal outer periphery as stated above. Alternatively, the outer periphery is formed with cutouts 17 at suitable portions and/or with at least one, preferably two to three, fastening cavities 8. While the cavities 8 and the cutouts 17 may be suitably positioned, it is desirable to arrange two cavities or cutouts on a diagonal line as illustrated. The fastening cavity 8 may be in the form of a hole as indicated at 8'. When the lock member 1 of shape memory alloy as screwed on the desired bolt is heated to the specified temperature, the member 1 on the nut 3 contracts to the momorized shape, firmly joining to the bolt surface as if by shrink fit.

Another embodiment of the invention will be described next with reference to FIG. 2.

A conventional nut 3 has an upper portion (exposed side) b which is partly cut away. A lock member 1 having substantially the same construction as the one shown in FIG. 1 is fitted in the cut portion. Stated more specifically with reference to FIG. 2, the fastening nut 3 made for example of steel SS41 is cut away at its one end to form a recessed portion 9, and the lock member 1 is fitted in the portion 9. The lock member 1 is formed along its inner periphery with threads 5 which are the same as the threads 4 of the nut 3 or are so made as to loosely fit to a corresponding bolt.

The lock member 1, although fitted to the exposed side b as shown in FIG. 2, may alternatively be fitted to the fastening side a. However, it is desirable to use the member 1 on the exposed side a to facilitate heating and produce an enhanced effect to prevent loosening.

Figure 2A:
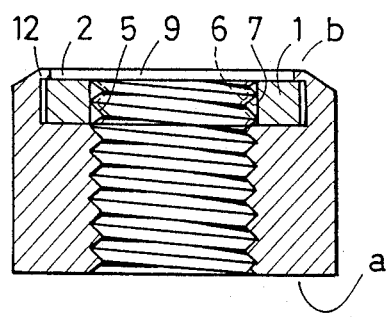

When the lock member 1 is fitted in the recessed portion 9, the upper edge of the nut 3 remains projected upward beyond the upper side of the member 1 over the entire periphery of the nut upper end or a portion thereof. The edge is bent inward to hold the member. Indicated at 12 in FIG. 2(A) is the bent portion.

Figure 2B:
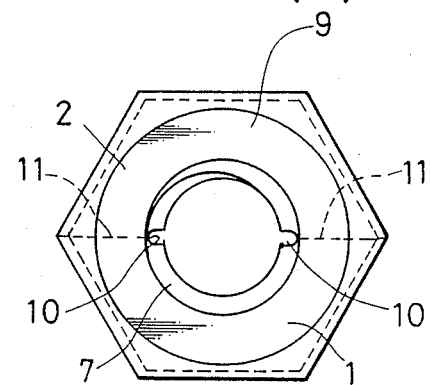

The threaded portion of the inner periphery 2 of the lock member 1 is formed with cutouts 10 as seen in FIG. 2(B). When the lock member 1 is cut with a chisel or some other suitable tool along a broken line 1 through the cutouts 10, the nut 3 is released from the lock member 1 and made rotatable and removable from the bolt.

Examples of useful shape memory alloys are those already known as such. An example of preferred alloy is an iron-base alloy comprising 28 to 34% (by weight, the same as hereinafter) of manganese, 5 to 7% of silicon and 5% of chromium. This alloys deforms at a temperature of 120° C. to 170° C.

FIG. 3 shows another lock member embodying the invention and having at least one protuberance. The member thus formed with such protuberance is forcibly made into a flat form, screwed up in place and thereafter restored to the original shape with the protuberance by being heated, with the result that the lock member appears contracted only at the protuberance, exhibiting a great fastening force. A desired number of protuberances may be provided at desired locations, insofar as the lock member is made to pre-memorize the shape of the protuberances.

This type of lock member will be described below in greater detail with reference to FIG. 3 (A).

An annular plate (hereinafter referred to as a "ring") 13 having a polygonal or circular outer periphery is prepared from a shape memory alloy. The ring has two upwardly bulging protuberances 14. While being restrained (or without being restrained if the ring retains its shape), the ring is heated, for example, at 400° C. to 500° C. for 30 minutes to 60 minutes to cause the ring to memorize the shape. Subsequently, the protuberances 14 are stretched to a flat form. When required, the ring is further enlarged radially. The ring 13 is then internally threaded in the same dimensions as the threads of the nut to be used therewith. When the ring 13 is to be threaded before flattening, i.e. immediately after the shape memorizing step, it is threaded in dimensions several % smaller than the above, such that when the ring 13 is flattened and radially enlarged, the resulting threads will have the same dimensions as those of the nut. Preferably, the threaded inner periphery of the ring 13 is cut out as indicated at 15 at the positions of the protuberances 14. Indicated at 16 are cavities or holes for use in screwing up the ring 13.

The lock member shown in FIG. 3 (A) may be used in combination with the fastening nut like the one shown in FIG. 1, or fitted in a portion of the nut as seen in FIG. 2. When to be used in combination with the nut in the manner shown in FIG. 1, the member is preferably screwed down on the nut in intimate contact therewith with the greatest possible force. When subsequently heated, for example, at 120° C. to 170° C., the lock member is deformed owing to the memory effect, forming the protuberances 14 and radially contracting at the same time to firmly join to the bolt as if by shrink fit. The fastening force exerted by the member on the bolt is as great as 10 kg/mm$^2$, locking the bolt very effectively against loosening.

Figure 3A:
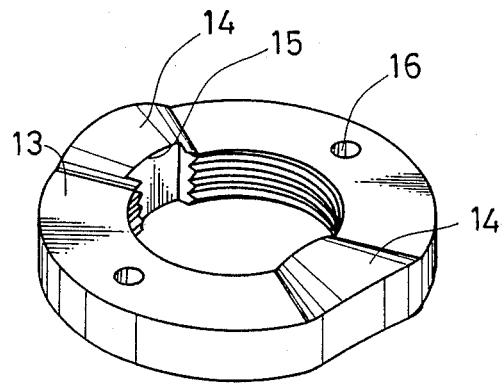

The lock member shown in FIG. 3(A) has the following outstanding advantages.

(1) When screwed up in locking position, the lock member has not restored itself to the original shape 100% but remains unrestored to some extent. Accordingly, for example when the member is thereafter subjected to a change in temperature during use, the unrestored portion is further restored, effectively acting to prevent loosening as against vibration.

(2) The protuberances 14 produced by heating indicate that the lock member made of shape memory effect is serving a locking function against loosening owing to its memory effect. Thus, the locking function can be recognized visually.

(3) The presence of the protuberances 14 does not permit the lock member to restore itself to the memorized shape uniformly in its entirety. The uneven restoration causes distortion, resulting in more effective locking.

The lock member of the invention is released from the locking position in the following manner.

The lock member screwed up tight on the bolt is removed by flattening the protuberances 14 to the shape of a flat washer, i.e., by stretching the protuberances 14 by hammering or by screwing down another nut on the lock member to stretch the protuberances 14. When the protuberances 14 have the cutout 15 at their inner end, the protuberances 14 can be stretched flat easily for unlocking.

Figure 3B:
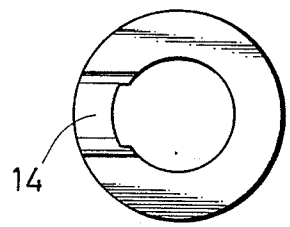
Figure 3C:
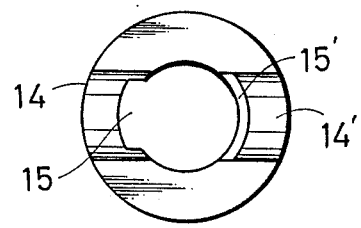
Figure 3D:
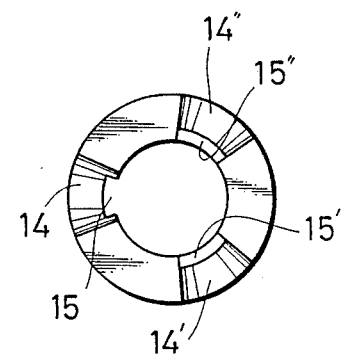
Figure 3F:
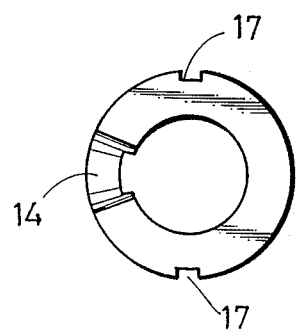
Figure 3E:
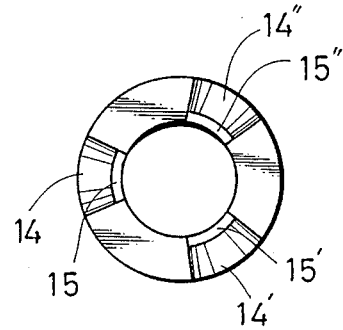

FIGS. 3(B) to (E) show preferred modifications of the lock member of FIG. 3(A). FIG. 3(B) shows a lock member having one protuberance 14 and a cutout 15 formed at the inner end of the protuberance 14 and extending through the entire thickness of the member. The lock member of FIG. 3(C) has two protuberances 14, 14'. The protuberance 14 is formed with the same cutout 15 as shown in FIG. 3(B). The protuberance 14' has a cutout 15' which is recessed from the threaded inner periphery of the member radially outward thereof and which extends axially of the member almost to the bottom side thereof. The lock member of FIG. 3 (D) has three protuberances 14, 14' and 14". The cutouts 15' and 15" shown are the same as the cutout 15' of FIG. 3 (C). The member of FIG. 3 (E) has three protuberances which are the same as the protuberance 14' of FIG. 3 (C) and each of which has a cutout which is the same as the cutout 15' of FIG. 3 (C).

The protuberances described above are not limited to the upwardly bulged shape shown in FIG. 3 (A) but can be in any shape insofar as the restored shape projects axially of the screw. Further the height of the protuberance is not limited specifically either. Although the lock members of FIGS. 3 (A) to (E) are each in the form of a circular ring, these members can be polygonal, e.g. hexagonal, or elliptical.

To render these lock members easy to screw up or release, the member is preferably formed with cutouts 17 as shown in FIG. 3 (F) or the fastening cavities or holes 16 shown in FIG. 3 (A).

Figure 4A:
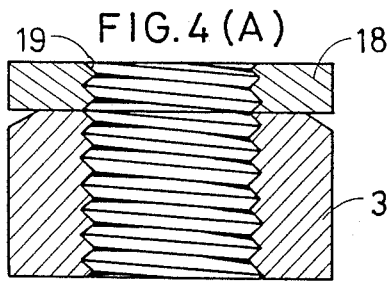
Figure 4B:
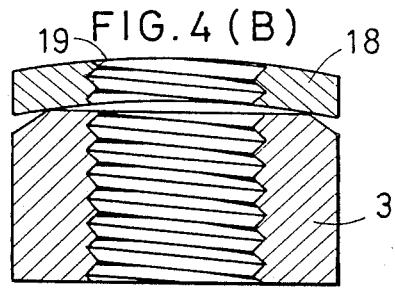
Figure 5A:
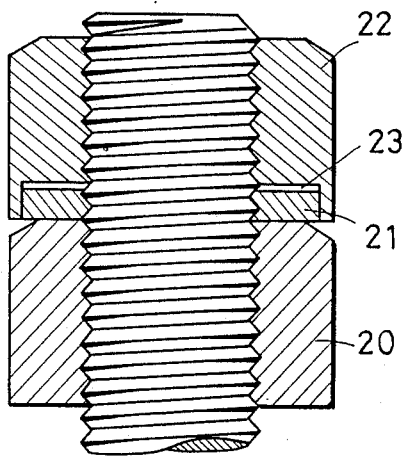
FIG. 5(A) is a side elevation in vertical section showing another lock member of the invention before locking (before heating)
Figure 5B:
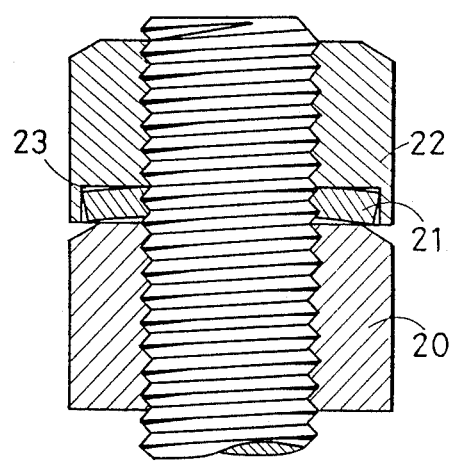
FIG. 5(B) is a similar view showing the same member in its locking position (after heating)
Figure 5C:
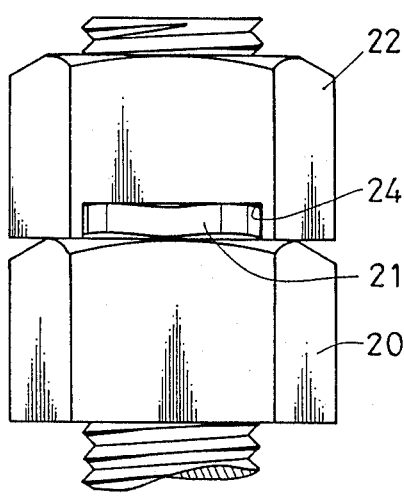
FIG. 5(C) shows an auxiliary nut as used in combination with the same member.
Figure 5D:
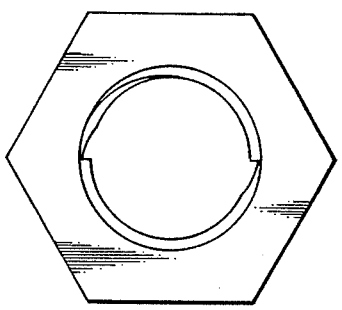
FIG. 5(D) is a top view of the nut of FIG. 5(C).

FIGS. 4 (A) and (B) show another lock member embodying the invention. The member is inclined from its inner periphery 19 toward the outer periphery 18 thereof and is so shaped that the outer peripheral portion 18 is in intimate contact with a nut. FIG. 4 (A) shows the member before heating, and FIG. 4 (B) shows the same after heating. In this case, the member is flattened, then screwed on a bolt in intimate contact with the nut 3 and thereafter heated and thereby caused to exhibit its memory effect. Consequently, the lock member with its inner periphery tightly fitting to the bolt as if by shrink fit is bent toward the nut at its outer peripheral portion into more intimate contact with the nut 3, preventing the nut from slacking back effectively. This construction is applicable to all the lock members of FIGS. 1 to 3.

FIGS. 5 (A) and (B) show another annular lock member 21 embodying the invention. As seen in FIG. 5 (A), the member 21 is screwed down on a nut 20, and an auxiliary nut 22 is further screwed on the nut 20. FIG. 5 (A) shows the member 21 before heating, and FIG. 5 (B) shows the same after heating. While a usual nut serving as the auxiliary nut 22 may be screwed down on the flat annular lock member 21 in intimate contact therewith, it is desirable to form a small space 23 therebetween as seen in FIG. 5 (A) to permit the lock member 21 to undergo deformation. When the lock member 21 of shape memory alloy is caused to restore itself to the memorized shape by heating as seen in FIG. 5 (B), the member 21 deforms within the space 23, forming protuberances, waves or the like, or deforms to a conical shape in the space 23 like the one shown in FIG. 4 (B), consequently producing a locking effect in pressing contact with the nut 20 and the auxiliary nut 22. Moreover, with the lock member thus deformed, the regular threads of the lock member formed by tapping the member in its flat state are similarly deformed and bite into some threads of the bolt, acting to twist the bolt thread from its opposite sides. For example, when the lock member is made of a shape memory alloy having a hardness of 220 HV and tensile strength of 100 kgt/mm$^2$ and when the bolt has a hardness of 150 HV and tensile strength of 51 kgt/mm$^2$, the lock member clamps the bolt with such a great force as to deform the threads of the bolt.

To release the lock member 21 from the biting engagement, the auxiliary nut 22 having a ragged side defining the space 23 is inverted and then screwed down on the lock member 21, causing the other side 24 of the nut 22 to press the member 21 to a stretched flat form.

Although the lock member 21 shown in FIGS. 5 (A) and (B) is threaded, the lock member may be made to memorize a protuberant, wavy, conical or like shape without forming any thread therein.

The lock member 21 may be adapted to fit into the auxiliary nut by screwing. Further as seen in FIG. 5 (C), observation apertures 24 may be formed in the auxiliary nut 22 or the nut 20.

When the lock member of the invention is prepare from an iron-base alloy of the Fe-Mn-Si-Cr-X type wherein X is other metal, the mode of shape memory of the member is unidirectional, and the shape memory effect is exhibited at high temperatures of at least 100° C. The alloy is a high-strength material which is 80 to 100 kgf/mm$^2$ in tensile strength, 35 to 45 kgf/mm$^2$ in yield strength and 12 to 18% in elongation. Accordingly, when the lock member as installed in the locking position is heated at 120° C. to 170° C. and thereby made to restore itself to the memorized shape, the member exhibits a very great locking effect against loosening. Moreover, in the case of the lock member of FIG. 3, the member remains partly unrestored in shape even after being heated in the locking position, consequently exhibiting high performance to withstand changes in temperature of as high as up to 400° C.

The present lock member is useful, for example, for motor vehicles. Since the coating on motor vehicle bodies is baked at 120° C. to 140° C., such lock members as used in the motor vehicle can all be made to exhibit the memory effect which the vehicle is passed through the baking process.

The lock member of the invention need not always be made of the iron-base shape memory alloy. Other shape memory alloys with different deformation temperatures are similarly useful. A bidirectional alloy is of course usable to provide a lock member which is adapted to memorize two different shapes so as to be fittable to and releasable from a bolt at different temperatures.

The present lock member is releasable from the locking position selectively by one of three methods, i.e. by cutting the lock member with a chisel, hammering the member to a flat form, and screwing down another nut on the lock member to flatten and stretch the protuberance.

The shape memory alloy to be used in the present invention can be a directional alloy having such nature that when subjected to an altered temperature, the alloy restores itself to the shape previously memorized. When the lock member is made of this directional alloy, the lock member can be easily released from the locking position by changing the temperature. In this case, therefore, the unlocking means such as cutouts or the like need not be provided. An example of useful directional alloy is Cu-Al-Ni-Mn-Ti alloy, more specifically, one comprising 80% of Cu, 12% of Al, 5% of Ni, 2% of Mn and 1% of Ti (all the percentages are by weight).

Further the present invention can be embodied as a bolt made of a shape memory alloy for use in combination with a usual nut. To prepare the bolt of shape memory alloy, a blank is first caused to memorize the dimensions slightly larger than the primary dimensions of the bolt to be obtained and before threading, and then compressed to the specified primary dimensions. The blank is then threaded in desired dimensions by cutting or rolling.

The blank must be threaded at a temperature below the temperature where recovery of the memory starts.

When the bolt is heated with a nut screwed thereon to cause the bolt to restore itself to the memorized shape, threads of the bolts expand into pressing contact with the internally threaded portion of the nut while also expanding into grooves of the nut to exhibit a reliable locking effect.

To release the nut, the nut is formed with a cutting edge, which acts to cut the bolt when the nut is rotated for removal. More specifically as seen in FIG. 5 (D), the thread of the nut is partially hardened as by high-frequency heating so as to serve as a cutting edge. When the nut is rotated reversely for loosening, the edge cuts the bolt while being unscrewed from the bolt.

What is claimed is:

1. A lock nut comprising a lock member prepared from an alloy having a shape memory for returning to and retaining said lock member in a locking shape when said lock member is heated to a temperature above ambient temperature, said lock member being formed in said locking shape at ambient temperature and being distorted at said ambient temperature into a shape larger than said locking shape for positioning said locking member at said ambient temperature in locking position before heat is applied to return and retain said locking member in said locking shape.

2. A lock nut as defined in claim 1 wherein said lock member is fitted in a portion of a conventional nut.

3. A lock nut as defined in claim 1 wherein said lock member is diametrically contractable for restoring itself to said memory shape.